(12) United States Patent
Schmitz et al.

(10) Patent No.: US 7,775,598 B2
(45) Date of Patent: Aug. 17, 2010

(54) FITTING FOR A VEHICLE SEAT

(75) Inventors: Ralph Schmitz, Clinton Township, MI (US); Michael Eblenkamp, Clarkston, MI (US)

(73) Assignee: KEIPER GmbH & Co. KG, Kaiserslautern (DE)

( * ) Notice: Subject to any disclaimer, the term of this patent is extended or adjusted under 35 U.S.C. 154(b) by 374 days.

(21) Appl. No.: 11/824,891

(22) Filed: Jul. 3, 2007

(65) Prior Publication Data

US 2009/0008980 A1 Jan. 8, 2009

(51) Int. Cl.
*B60N 2/02* (2006.01)
*B60N 2/22* (2006.01)
*B60N 2/235* (2006.01)

(52) U.S. Cl. .................... 297/378.12; 297/362
(58) Field of Classification Search ................. 297/362, 297/378.12
See application file for complete search history.

(56) References Cited

U.S. PATENT DOCUMENTS

| | | | |
|---|---|---|---|
| 5,634,689 A | 6/1997 | Putsch et al. | |
| 6,332,647 B1 * | 12/2001 | Yoshida et al. | 297/238 |
| 6,402,249 B1 * | 6/2002 | Rohee et al. | 297/367 R |
| 6,540,232 B2 | 4/2003 | Hänsel et al. | |
| 6,540,297 B2 | 4/2003 | Hänsel et al. | |
| 6,585,324 B2 | 7/2003 | Eppert et al. | |
| 6,598,938 B2 | 7/2003 | Boltze et al. | |
| 6,619,743 B1 | 9/2003 | Scholz et al. | |
| 6,722,739 B2 | 4/2004 | Klein et al. | |
| 6,742,845 B2 | 6/2004 | Nock | |
| 6,799,806 B2 | 10/2004 | Eppert et al. | |
| 6,840,579 B2 | 1/2005 | Klein et al. | |
| 6,880,888 B2 | 4/2005 | Rabbach et al. | |
| 6,893,093 B2 | 5/2005 | Nock et al. | |
| 7,000,992 B2 | 2/2006 | Armbrust et al. | |
| 2002/0170381 A1 | 11/2002 | Hänsel et al. | |
| 2003/0090138 A1 | 5/2003 | Rabbach et al. | |

(Continued)

FOREIGN PATENT DOCUMENTS

EP 0 872 375 B1 10/1998

(Continued)

OTHER PUBLICATIONS

U.S. Appl. No. 11/654,825, filed Jan. 18, 2007, In re: Peter Thiel et al., entitled *Fitting for a Vehicle Seat*.

*Primary Examiner*—David Dunn
*Assistant Examiner*—Tania Abraham
(74) *Attorney, Agent, or Firm*—Womble Carlyle Sandridge & Rice, PLLC

(57) ABSTRACT

In the case of a fitting (10) for a vehicle seat, in particular for a motor vehicle seat, having a first fitting part (11), a second fitting part (12) in geared connection with the first fitting part (11), and a rotatably mounted eccentric (26, 27) driven by a driver (21, 26) to cause relative rolling between the first fitting part (11) and the second fitting part (12), a third fitting part (54) can be both pivoted freely relative to the first fitting part (11) in an unlocked state and locked with respect to the first fitting part (11) in a locked state, wherein a disengagement mechanism (80) is provided for maintaining the unlocked state of the third fitting (11) part during pivoting freely.

20 Claims, 3 Drawing Sheets

U.S. PATENT DOCUMENTS

| | | |
|---|---|---|
| 2003/0214165 A1 | 11/2003 | Finner et al. |
| 2005/0179297 A1 | 8/2005 | Finner et al. |
| 2006/0055219 A1 | 3/2006 | Heimann et al. |
| 2006/0055223 A1 | 3/2006 | Thiel et al. |
| 2006/0061197 A1 | 3/2006 | Messerschmidt et al. |
| 2006/0170268 A1 | 8/2006 | Nock et al. |
| 2006/0284471 A1 | 12/2006 | Assmann et al. |

FOREIGN PATENT DOCUMENTS

| | | |
|---|---|---|
| EP | 1 334 867 B1 | 8/2003 |
| WO | WO 03/024740 A1 | 3/2003 |
| WO | WO 2004/087458 A2 | 10/2004 |
| WO | WO 2004/103766 A1 | 12/2004 |
| WO | WO 2004/113116 A1 | 12/2004 |
| WO | WO 2005/084996 A1 | 9/2005 |

* cited by examiner

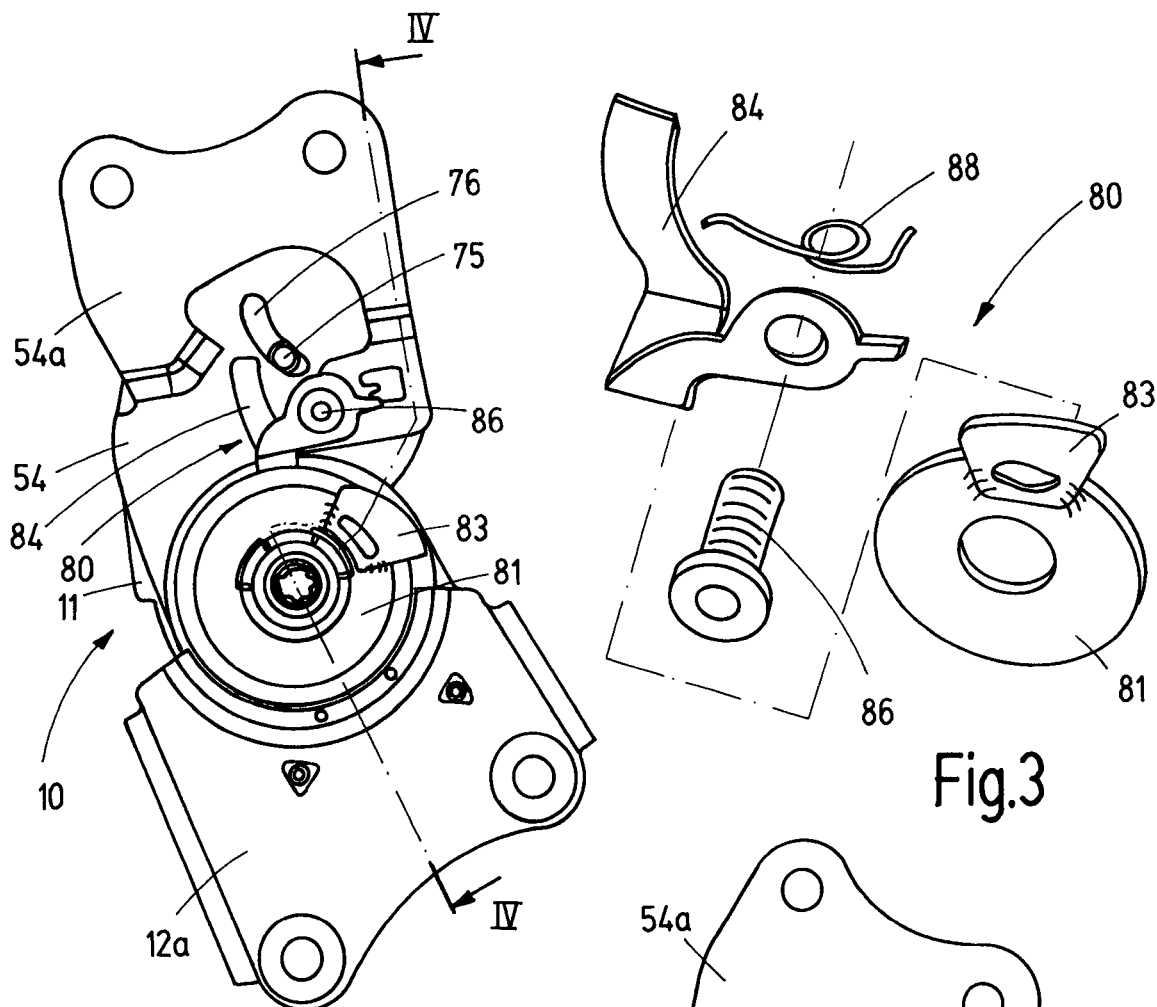
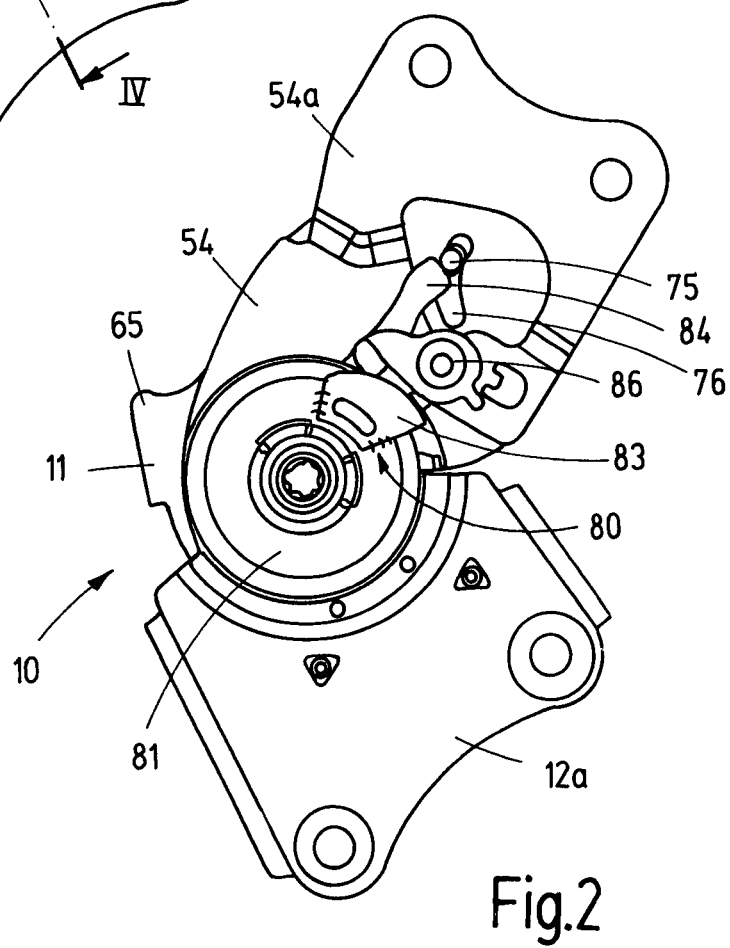
Fig.1
Fig.3
Fig.2

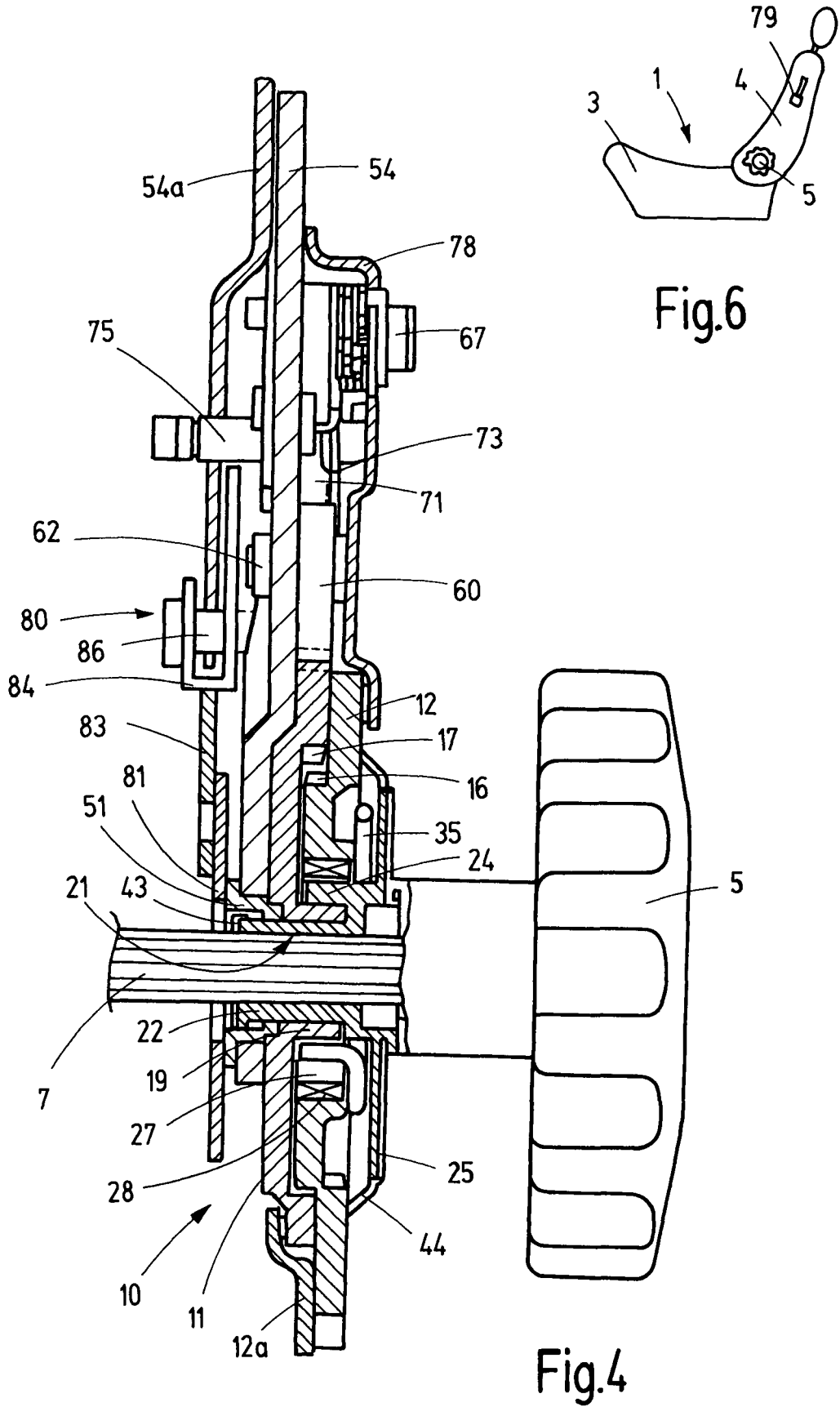

FITTING FOR A VEHICLE SEAT

BACKGROUND OF THE INVENTION

The present invention relates to a fitting for a vehicle seat, in particular for a motor vehicle seat, comprising a first fitting part and a second fitting part, wherein there is geared connection between the first fitting part and the second fitting part so that there can be relative rolling between the first fitting part and the second fitting part; a rotatably mounted eccentric for being driven, and for causing the relative rolling between the first fitting part and the second fitting part in response to the eccentric being driven; a driver for driving the eccentric so that the eccentric causes the relative rolling between the first fitting part and the second fitting part, wherein the fitting is operative for steplessly adjusting inclination of a backrest of the vehicle seat by way of the relative rolling between the first fitting part and the second fitting part, which occurs in response to the eccentric being driven; a third fitting part mounted for being pivoted relative to the first fitting part, enabling pivoting of the backrest of the vehicle seat relative to both the first fitting part and the second fitting part; a locking mechanism for providing locked and unlocked states of the third fitting part, wherein the third fitting part is at least indirectly locked with respect to the first fitting part during the locked state of the third fitting part, and the third fitting part can be pivoted relative to the first fitting part during the unlocked state of the third fitting part.

A fitting that is of this type is disclosed in U.S. patent application Ser. No. 11/654,825. The first fitting part is provided with a detent element interacting with the third fitting part and also serving as a stopper for the relative movement of the first fitting part and the second fitting part. If the third fitting part, i.e. the backrest, is pivoted forward and reaches its frontmost position, the locking mechanism will provisionally lock the third fitting due to the special shape of the detent element.

BRIEF SUMMARY OF SOME ASPECTS OF THE INVENTION

An aspect of the present invention is the provision of improvements to a fitting of the type described immediately above, for example to increase the range of applications for such a fitting.

In accordance with one aspect of the present invention, a fitting for a vehicle seat, in particular for a motor vehicle seat, comprises a first fitting part and a second fitting part, wherein there is geared connection between the first fitting part and the second fitting part so that there can be relative rolling between the first fitting part and the second fitting part; a rotatably mounted eccentric for being driven, and for causing the relative rolling between the first fitting part and the second fitting part in response to the eccentric being driven; a driver for driving the eccentric so that the eccentric causes the relative rolling between the first fitting part and the second fitting part, wherein the fitting is operative for steplessly adjusting inclination of a backrest of the vehicle seat by way of the relative rolling between the first fitting part and the second fitting part, which occurs in response to the eccentric being driven; a third fitting part mounted for being pivoted relative to the first fitting part, enabling pivoting of the backrest of the vehicle seat relative to both the first fitting part and the second fitting part forward into a dump (e.g., substantially horizontal) position; a locking mechanism for providing locked and unlocked states of the third fitting part, wherein the third fitting part is at least indirectly locked with respect to the first fitting part during the locked state of the third fitting part, and the third fitting part can be pivoted relative to the first fitting part during the unlocked state of the third fitting part; and a disengagement mechanism for maintaining the unlocked state of the third fitting part during pivoting into the dump position.

The use of an eccentric planetary gear permits the angle of inclination of the backrest to be steplessly adjusted. The eccentric planetary gear can be driven manually or by way of a motor.

Using a third fitting part, which is pivotable relative to the first fitting part and can be locked with the first fitting part, it is possible to pivot the backrest freely and/or into a dump (e.g., substantially horizontal) position, independently of the inclination setting, and without influencing that setting. The number of possible areas of application and the comfort level are increased.

The disengagement mechanism avoids a locking of the third fitting part in the dump position.

Other aspects and advantages of the present invention will become apparent from the following.

BRIEF DESCRIPTION OF THE DRAWINGS

The invention is described in more detail below with reference to an exemplary embodiment illustrated in the drawings, in which:

FIG. 1 shows a side view of the exemplary embodiment in a use position,

FIG. 2 shows a side view of the exemplary embodiment during pivoting into the dump (e.g., substantially horizontal) position, FIG. 3 shows an exploded illustration of the disengagement mechanism, FIG. 4 shows a section through the exemplary embodiment, along the line IV-IV in FIG. 1 and in FIG. 5, FIG. 6 shows a diagrammatic illustration of a vehicle seat.

DETAILED DESCRIPTION OF EXEMPLARY EMBODIMENT

Figure 5:
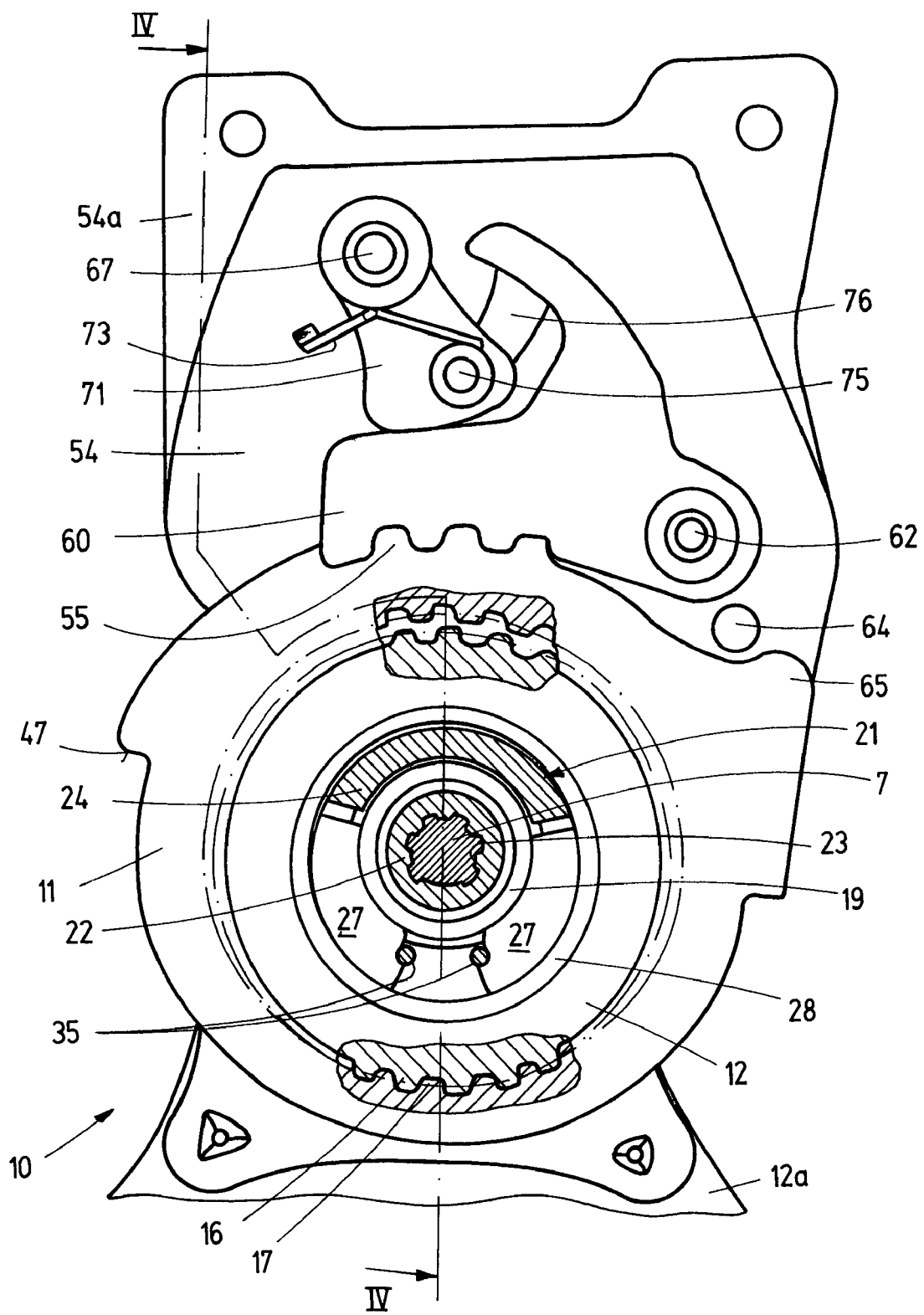
FIG. 5 shows a partially sectioned view of the exemplary embodiment from the opposite side of FIG. 1.

A vehicle seat 1 for a motor vehicle includes a seat part 3 and a backrest 4. The inclination of the backrest 4 can be adjusted relative to the seat part 3 by way of a motor drive. For adjusting the inclination of the backrest, a handwheel 5 (or an electric motor) is used to rotate a drive shaft 7 which is arranged horizontally in the transition zone between the seat part 3 and the backrest 4. On both sides of the vehicle seat 1, the drive shaft 7 engages in a fitting 10 in a rotationally fixed manner that will be described further below. The drive shaft 7 defines the directional data of a cylindrical coordinate system that is used in this description.

The fitting 10 is designed as a geared fitting in which a first fitting part 11 and a second fitting part 12 are connected with each other by way of a gear for the purpose of making and securing adjustments. More specifically, the first fitting part 11 and the second fitting part 12 are connected by way of an eccentric planetary gear—in the exemplary embodiment a self-locking planetary gear—as described, for example, in U.S. Pat. No. 5,634,689. The entire disclosure of U.S. Pat. No. 5,634,689 is incorporated herein by reference. In the exemplary embodiment, the plate-shaped second fitting part 12 is firmly connected with the structure of the seat part 3, i.e. it is fixedly attached to the seat part 3, by means of a seat part adapter 12a. In another arrangement the positions of the fittings 11 and 12 can be interchanged. The two fitting parts 11 and 12 may also be disc-shaped.

In order to form the gear mechanism, a toothed wheel 16 with external toothing is embossed on the second fitting 12, a toothed ring 17 with internal toothing is formed on the first fitting 11, and the toothed wheel and the toothed ring intermesh with each other. The diameter of the tip circle of the external toothing of the toothed wheel 16 is smaller by at least the height of one tooth than the diameter of the root circle of the internal toothing of the toothed ring 17. A corresponding difference of at least one tooth between the number of teeth in the toothed wheel 16 and in the toothed ring 17 permits the toothed ring 17 to roll on the toothed wheel 16. Thus, an eccentric planetary gear is provided.

Concentrically to the internal toothing of the toothed ring 17, the first fitting part 11 has an integrally formed collar element 19 on the side facing the toothed wheel 16. A driver 21 is mounted by way of a hub 22 inside the collar element 19. The driver 21 is provided with a receptacle (e.g., provided centrally with a borehole 23) for receiving the drive shaft 7. The profile of the borehole 23 matches the profile of the drive shaft 7, which in the exemplary embodiment is the profile of a splined shaft. In a radial distance to its hub 22, the driver 21 includes a driving segment 24 arranged on the (radial) outside of the collar element 19 and extending around the collar element 19 for less than 160° in the circumferential direction. At one end of the hub 22, the driver 21 is provided with a cover disc 25 having a larger diameter than the hub 22. In the present embodiment, the driver 21 with hub 22, driving segment 24, and cover disc 25 is made of one piece, but it may also be made of several pieces, as described, for example, in U.S. Pat. No. 7,188,903. The entire disclosure of U.S. Pat. No. 7,188,903 is incorporated herein by reference.

On its (radial) outside, the collar element 19 supports two wedge segments 27 which, by way of their curved outer surfaces, support a sliding bearing bushing 28 which is pressed in a rotationally fixed manner into the second fitting part 12. The two wedge segments 27 together extend for more than 180° in the circumferential direction. The driving segment 24 engages with play between the narrow ends of the wedge segments 27. The driver 21 may be provided with axial projections touching the two wedge segments 27, to secure the wedge segments 27 in the axial direction.

The broad ends of the wedge segments 27 face each other. Each of the broad ends of the wedge segments 27 accommodate, by way of a recess defined by projecting sections of material, an angled end finger of an annular spring 35. The spring 35 pushes (e.g., urges) the wedge segments 27 apart from one another in the circumferential direction, so that in the event of the wedge segments 27 becoming blocked during operation or if the backrest 4 comes up against a load, the radially outer, projecting sections of material (which are located at the broad ends of the wedge segments 27) may come into contact with and act upon one another.

The driver 21 is secured axially on the outside of the first fitting part 11 by way of a clipped-on securing ring 43. A sealing ring 44 is provided on the outside of the second fitting part 12, between the embossing for the toothed wheel 16 and the cover disc 25 of the driver 21.

The wedge segments 27 define an eccentric which, by extension in the direction of the eccentricity, presses the toothed wheel 16 into the toothed ring 17 at an engagement point defined by the cooperative design/interaction between the toothed wheel, toothed ring and eccentric. When the drive force is provided by the rotating drive shaft 7, torque is transmitted first to the driver 21 and by the rotating driver 21 to the eccentric, so that the eccentric slides along the sliding bearing bushing 28, changing the direction of the eccentricity and thus changing the point of engagement of the toothed wheel 16 in the toothed ring 17, which manifests itself as a wobbling rolling movement, i.e. as relative rotation with a superimposed wobbling motion. The inclination of the backrest 4 can thus be steplessly adjusted between several use positions.

In order to limit the range of adjustment between the first and second fitting parts 11, 12, the first fitting part 11 is provided with a first stopper 47. If the backrest 4 is inclined to the front-most position, the first stopper 47 will come to bear against an adapter projecting axially from the second fitting part 12 or another part of the structure of the seat part 3.

During an unlocked state discussed in greater detail below, the backrest 4 can be freely pivoted, by way of the fitting 10, e.g., in order to facilitate access to a row of seats behind the vehicle seat 1. The pivoting of the backrest 4 can even be continued to achieve a more or less (e.g., substantially) horizontal position of the backrest, which is referred to as the dump position, e.g., in order to enlarge the space for storing goods. According to the invention, the backrest 4 can be separately unlocked and manually pivoted forward, without moving the two fitting parts 11 and 12 relative to each other. In accordance with the exemplary embodiment, when the backrest 4 has been pivoted forwardly to the "dump position", the backrest 4 extends more or less (e.g., substantially) horizontally and is typically in opposing face-to-face relation with seat part 3. In accordance with the exemplary embodiment and more specifically, the backrest 4 may be (e.g., typically is) in opposing face-to-face contact with the seat part 3 while the backrest 4 is in the dump position, as discussed below.

The fitting 10 comprises an annular-shaped bearing ring 51 that has a radially projecting flange at one end face. At its other end face, the bearing ring 51 is fixedly connected to the first fitting 11, preferably by laser welding. The fitting 10 further comprises a third fitting part 54 which is connected to the structure of the backrest 4, i.e. is fixedly attached to the structure of the backrest 4, by means of a backrest adapter 54a. The plate-shaped third fitting part 54 is pivotably supported on the bearing ring 51, so that the third fitting part is pivotable around the central axis defined by the drive shaft 7 in order to permit centered, free pivoting relative to the first fitting part 11; otherwise, however, the third fitting part 54 is locked (e.g., indirectly locked) with the first fitting part 11.

A detent element 55 is integrally formed with the first fitting part 11. The detent element 55 is spaced apart from the first stopper 47. The detent element 55 serves to lock the third fitting element 54 to the first fitting part 11. For this purpose, a pawl 60 is pivotably mounted on the third fitting part 54 by way of a first bearing bolt 62. The pawl 60 is pivotable in the same plane as the detent element 55, and the first bearing bolt 62 extends parallel to the drive shaft 7. On the side facing the detent element 55, the pawl 60 is provided with teeth for interacting with the detent element 55, which is also formed as teeth. A stop bolt 64 of the third fitting part 54 bears against a second stopper 65 of the first fitting part 11 in the rearwards-pivoting direction of the third fitting element 54.

In accordance with the exemplary embodiment of the present invention, the detent element 55 and the pawl 60 can each be characterized as being part of a locking mechanism that is for: locking the third fitting part 54 by engagement, to provide a locked state of the third fitting part 54; and unlocking the third fitting part 54 by disengagement, to provide an unlocked state of the third fitting part 54.

Parallel to the first bearing bolt 62, a second bearing bolt 67 is arranged on the third fitting part 54. By way of the second bearing bolt 67, a securing element 71 is pivotably mounted on the third fitting part 54. The securing element 71 is pivotable in the same plane as the pawl 60 and is acted upon by a securing spring 73. The securing element 71 secures the locked state of the third fitting part 54 by acting on the pawl 60 to hold it engaged in the detent element 55. An unlocking pin 75 projects axially from the securing element 71 and passes outwards through a slot 76 in the third fitting part 54. Otherwise, the pawl 60 and the securing element 71 are protected by a cover 78 on the third fitting part 54.

In order to unlock the third fitting part 54—for example, by way of a manually operated hand lever 79 for pulling a cable that is connected to the unlocking pin 75—the unlocking pin 75 is pivoted in the slot 76, thereby taking with it the securing element 71 and pivoting the securing element relative to/away from the pawl 60. Then, the securing element 71 no longer acts upon the pawl 60. The pivoting securing element 71 comes to bear against an unlocking finger (e.g., a substantially radially projecting unlocking finger) on the pawl 60, thereby pulling the pawl 60 open. The pawl 60 is thus completely disengaged. The backrest 4 can now be pivoted forward into the dump position.

The peripheral section of the first fitting part 11 between the detent element 55 and the stopper 47 projects farther outwardly in the radial direction than the section ahead the stopper 47 or than the base of the teeth of the detent element 55. Thus, as long as the pawl 60 is located in the section between the detent element 55 and the stopper 47, the pawl 60 will not engage, even if the unlocking pin 75 is no longer pulled (with the lack of pulling on the unlocking pin 75 causing the spring 73 to move the securing element 71 towards and into contact with the pawl 60 so that the pawl is urged inwardly). If the pawl 60 passes the stopper 47 (after about 73°) and reaches the section ahead the stopper 47, and if the unlocking pin 75 is no longer pulled, a fitting according to the state of the art will allow the pawl 60 to engage with the section ahead the stopper 47 in a manner such that the unlocked state would not be maintained in the dump position.

According to the invention, a disengagement mechanism 80 is provided for maintaining the unlocked state of the third fitting part 54 in the dump position. The disengagement mechanism 80 comprises a cam ring 81 with a radially projecting cam 83 attached to the cam ring 81. The cam ring 81 is fixed to the first fitting part 11. The disengagement mechanism 80 also comprises a lever 84 pivotably mounted on the third fitting part 54 by means of a third bearing bolt 86, with a return spring 88 acting upon the lever 84. The lever 84 has a section next to the cam 83 and a section next to the unlocking pin 75 (and a section next the third bearing bolt 86). In the use positions of the vehicle seat 1 (e.g., when the backrest 4 is positioned so that a user may sit in the vehicle seat), the lever 84 neither interacts with the cam 83 nor with the unlocking pin 75. If the backrest 4 (and thus the third fitting part 54) is pivoted forward, the lever 84 comes into contact with the cam 83 and is pivoted by the cam 83 thus pushing against the unlocking pin 75. As a result, even if the unlocking pin 75 is no longer pulled, and even if the third fitting part 54 reaches the section of the first fitting part 11 ahead the stopper 47, the securing element 71 will be kept open by the disengaging mechanism 80, and thus the pawl 60 will be kept disengaged.

When the backrest 4 is being pivoted backwards and thereby out of the dump position, the lever 84 leaves the cam 83, the return spring 88 moves the lever 84 away from the unlocking pin 75, the stop bolt 64 comes to bear against the second stopper 65 of the first fitting part 11, the pawl 60 again enters into its locking state, and the securing element 71 secures this locked state.

It will be understood by those skilled in the art that while the present invention has been discussed above with reference to an exemplary embodiment, various additions, modifications and changes can be made thereto without departing from the spirit and scope of the invention as set forth in the following claims.

The invention claimed is:

1. A fitting for a vehicle seat having a backrest, the fitting comprising:
    a first fitting part and a second fitting part, wherein there is geared connection between the first fitting part and the second fitting part so that there can be relative rolling between the first fitting part and the second fitting part;
    a rotatably mounted eccentric for being driven, and for causing the relative rolling between the first fitting part and the second fitting part in response to the eccentric being driven;
    a driver for driving the eccentric so that the eccentric causes the relative rolling between the first fitting part and the second fitting part, wherein the fitting is operative for steplessly adjusting inclination of the backrest of the vehicle seat between use positions by way of the relative rolling between the first fitting part and the second fitting part, which occurs in response to the eccentric being driven;
    a third fitting part mounted for being pivoted relative to the first fitting part, for enabling forward pivoting of the backrest of the vehicle seat relative to both the first fitting part and the second fitting part into a dump position which is past the use position;
    a locking mechanism for providing locked and unlocked states of the third fitting part, wherein
        the third fitting part is at least indirectly locked with respect to the first fitting part during the locked state of the third fitting part, and
        the third fitting part can be pivoted relative to the first fitting part during the unlocked state of the third fitting part; and
    a disengagement mechanism comprising a cam connected to the first fitting part, and a lever pivotably mounted on the third fitting part, wherein
        the disengagement mechanism is for maintaining the unlocked state of the third fitting part during pivoting into the dump position, comprising the lever being adapted for interacting with the cam during pivoting into the dump position, and
        the lever is adapted for not interacting with the cam during the use positions.

2. The fitting according to claim 1, wherein the fitting is configured so that there is a superimposed wobbling motion during the relative rolling between the first fitting part and the second fitting part, so that the superimposed wobbling motion occurs during the steplessly adjusting of the inclination of the backrest between the use positions.

3. The fitting according to claim 1, wherein:
    the first fitting part includes a collar element,
    the eccentric is mounted on the collar element, and
    the driver is mounted in the collar element.

4. The fitting according to claim 1, wherein:
    the eccentric comprises two wedge segments that are urged away from one another.

5. The fitting according to claim 1, wherein the third fitting part being mounted for being pivoted relative to the first fitting part comprises:
    the third fitting part being pivotably mounted on a bearing ring, and the bearing ring being fixedly connected to the first fitting part.

6. The fitting according to claim 1, wherein the lever of the disengagement mechanism interacts with the cam at least in the dump position.

7. The fitting according to claim 1, wherein the cam of the disengagement mechanism is provided on a cam ring that is fixed to the first fitting part.

8. The fitting according to claim 1, wherein the first fitting part comprises a stopper for limiting a range of adjustment between the first and second fitting parts.

9. The fitting according to claim 8, wherein the disengagement mechanism maintains the unlocked state of the third fitting part when the third fitting part passes the stopper and reaches a section of the first fitting part that is ahead the stopper.

10. The fitting according to claim 9, wherein the dump position is reached when the third fitting part reaches the section of the first fitting part that is ahead the stopper.

11. The fitting according to claim 1, wherein the backrest is substantially horizontal in the dump position.

12. The fitting according to claim 1, wherein:
the lever being adapted for interacting with the cam comprises the lever being adapted for contacting the cam during pivoting into the dump position, so that the lever is for coming into contact with the cam in response to the pivoting into the dump position, and
the lever being adapted for not interacting with the cam comprises the lever being adapted for being out of contact with the cam during the use positions.

13. The fitting according to claim 1, wherein:
the locking mechanism comprises
a detent element for use in at least indirectly locking the third fitting part to the first fitting part,
a pawl carried by the third fitting part, wherein the pawl is in locking engagement with the detent element during the locked state of the third fitting part,
a movably mounted securing element for securing the pawl in the locking engagement with the detent element during the locked state of the third fitting part, and
an unlocking pin connected to the securing element, wherein the unlocking pin is adapted for use in disengaging the pawl from the detent element to transition from the locked state of the third fitting part to the unlocked state of the third fitting part while the backrest is in its use positions; and
the cam of the disengagement mechanism is adapted for causing the lever of the disengagement mechanism to pivot relative to the third fitting part in response to the pivoting into the dump position, so that the lever interacts with the unlocking pin for maintaining the unlocked state of the third fitting part during pivoting into the dump position.

14. The fitting according to claim 13, wherein the detent element is formed integrally with the first fitting part.

15. The fitting according to claim 13, wherein the securing element is spring-loaded for securing the pawl in the locking engagement with the detent element.

16. The fitting according to claim 15, wherein the securing element can be pivoted relative to the pawl by moving the unlocking pin that is connected to the securing element.

17. The fitting according to claim 16, wherein the lever of the disengagement mechanism acts upon the unlocking pin at least in the dump position.

18. The fitting according to claim 13, wherein:
the lever being adapted for interacting with the cam comprises the lever being adapted for contacting the cam during pivoting into the dump position, so that the lever is for coming into contact with the cam in response to the pivoting into the dump position, and
the lever being adapted for not interacting with the cam comprises the lever being adapted for being out of contact with the cam during the use positions.

19. The fitting according to claim 13, wherein:
the first fitting part comprises a stopper for limiting a range of adjustment between the first and second fitting parts;
the disengagement mechanism maintains the unlocked state of the third fitting part when the third fitting part passes the stopper and reaches a section of the first fitting part that is ahead the stopper; and
the dump position is reached when the third fitting part reaches the section of the first fitting part that is ahead the stopper.

20. The fitting according to claim 13, wherein the cam being connected to the first fitting part comprises:
a cam ring being fixedly connected to the first fitting part, and
the cam being attached to, and projecting radially from, the cam ring.

* * * * *